United States Patent [19]
Jurgensmeyer

[11] Patent Number: 5,788,729
[45] Date of Patent: Aug. 4, 1998

[54] ADJUSTABLE FILTER TRACK

[75] Inventor: Ken Jurgensmeyer, Maumelle, Ark.

[73] Assignee: Carrier Corporation, Syracuse, N.Y.

[21] Appl. No.: 678,975

[22] Filed: Jul. 12, 1996

[51] Int. Cl.⁶ .................................................. B01D 46/012
[52] U.S. Cl. ........................ 55/496; 55/481; 55/506
[58] Field of Search ........................ 55/481, 478, 496, 55/506, 511, 495, 440, 434, 488, 490; 211/184

[56] References Cited

U.S. PATENT DOCUMENTS

| | | | |
|---|---|---|---|
| 647,827 | 4/1900 | Guillaume | 55/434 |
| 1,012,122 | 12/1911 | Budil | 55/502 |
| 1,159,073 | 11/1915 | Nies et al. | 55/434 |
| 1,532,730 | 4/1925 | Chalupa et al. | 55/511 |
| 2,062,649 | 12/1936 | Hegan | 55/511 |
| 2,220,127 | 11/1940 | Slayter | 55/511 |
| 3,247,652 | 4/1966 | Annas et al. | 55/481 |
| 3,432,999 | 3/1969 | Ernst-Schraner | 55/490 |
| 3,707,046 | 12/1972 | De Baun | 55/511 |
| 4,627,406 | 12/1986 | Namiki et al. | 55/446 |
| 4,877,430 | 10/1989 | Gutermuth | 55/440 |
| 5,038,531 | 8/1991 | Olewska | 52/64 |
| 5,059,218 | 10/1991 | Pick | 55/511 |
| 5,199,584 | 4/1993 | Fowler et al. | 211/184 |

*Primary Examiner*—Jay H. Woo
*Assistant Examiner*—Robert Hopkins

[57] ABSTRACT

Apparatus for mounting different size filters in various combinations within an air duct that includes a frame for mounting channel shaped upper and lower support members in said duct so that the members open toward each other and extend across the width of the duct. Longitudinally disposed, spaced apart, removable dividers are slidably retained in the support members so that racks are established for retaining filters of varying widths between the support members. In one form of the invention intermediate support members are mounted between the upper and lower support members so that filters can be mounted in tiers within the apparatus.

12 Claims, 2 Drawing Sheets

5,788,729

1

ADJUSTABLE FILTER TRACK

BACKGROUND OF THE INVENTION

This invention relates to apparatus for mounting various combinations of filters in an air duct.

In many air handling systems, such as roof top air conditioning systems, air filter units are removably mounted in air ducts that carry air into or away from the conditioned region. Typically a standard size filter which includes a filtering material contained within a frame is slidably retained within a track mounted within the air duct so that air passing through the duct is forced to pass through the filter material. Accordingly, airborne particles and other containments are captured in the filters and removed from the airstream. The filter is periodically changed when the collected material might impede the flow of air through the duct.

The tracks that have heretofore been employed for slidably retaining filters in air ducts were fabricated from a relatively large number of sheet metal parts. As a consequence, the racks were difficult to assemble and install. The sheet metal parts making up the racks had a tendency to bend or misaligned making the charging of filters difficult.

Customer requirements now call for different combinations of filters to be used in association with a common air handling unit thus requiring that the air handling units be adjusted in the field to meet specific job applications. In certain applications the units must be adjusted to accommodate various combinations of filters.

SUMMARY OF THE INVENTION

It is therefore an object of the present invention to improve filter racks employed in air handling systems.

It is a further object of the present invention to provide a rack for slidably supporting filters of various sizes within an air duct.

A further object of the invention is to provide a filter rack for use in an air duct that can support various filter combinations.

A still further object of the present invention is to provide an adjustable filter rack for use in an air duct that has a minimum amount of parts, yet is easily adjustable so that filters of varying width can be supported therein.

These and other objects of the present invention are attained by a filter rack that includes a frame mounted within an air duct in which channel shaped upper and lower support members are mounted so that the open faces of the channels face each other. Vertically aligned slides are mounted inside the channels in parallel rows that extend across the duct. Dividers are slidably supported in the slides which cooperate with each other and the side flanges of the support members to establish vertically disposed tracks in which filters can be slidably retained. By mounting the dividers in selected rows, filters of different widths can be mounted in the tracks.

In a further embodiment of the invention, intermediate support members can be placed in the frame between the upper and lower support members whereby the filters can be mounted in tiers within the air duct.

BRIEF DESCRIPTION OF THE DRAWINGS

For a better understanding of these and other objects of the present invention, reference will be made to the following detailed description of the invention which is to be read in association with the accompanying drawings, wherein:

2

Figure 1:
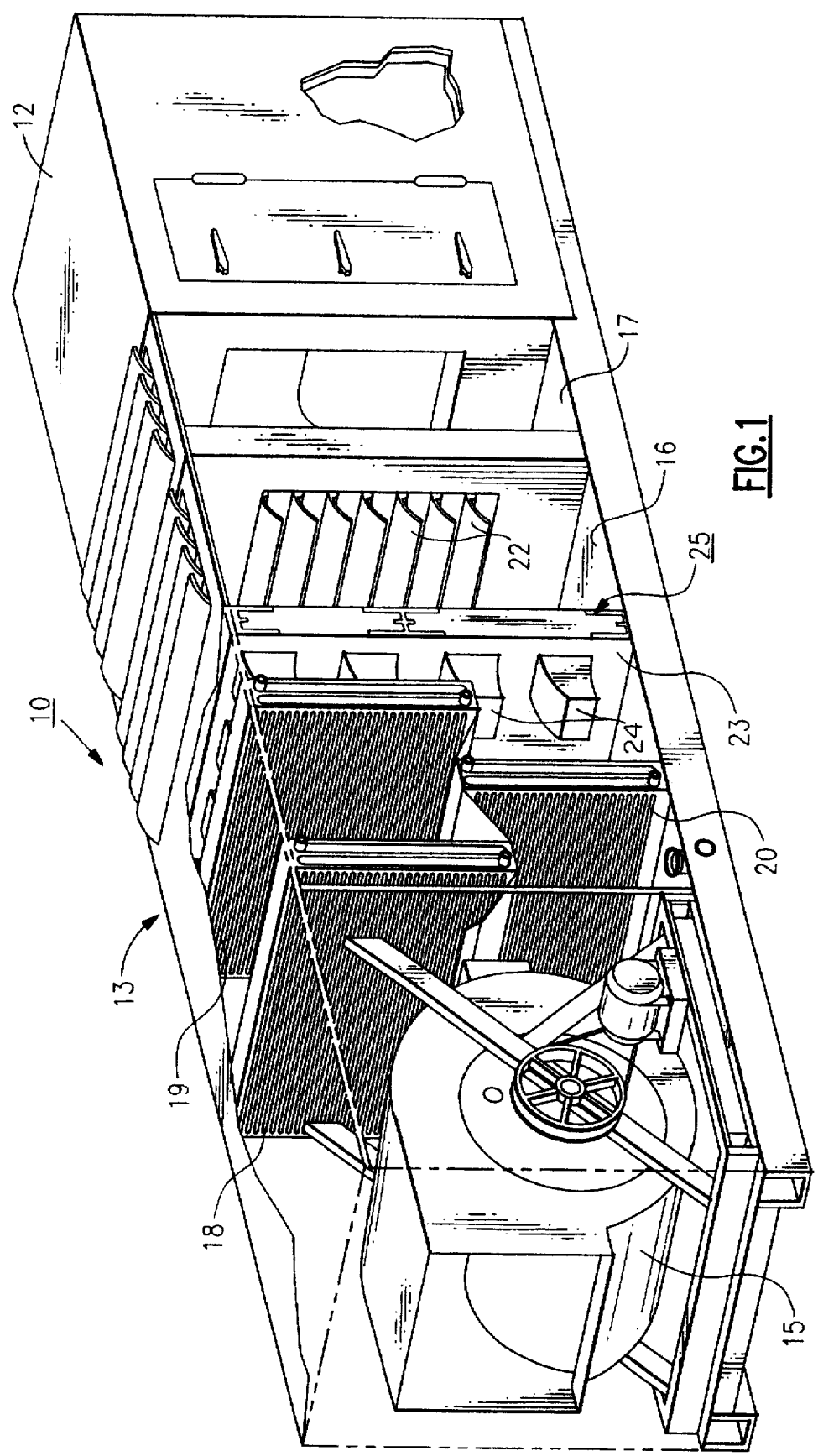
Figure 2:
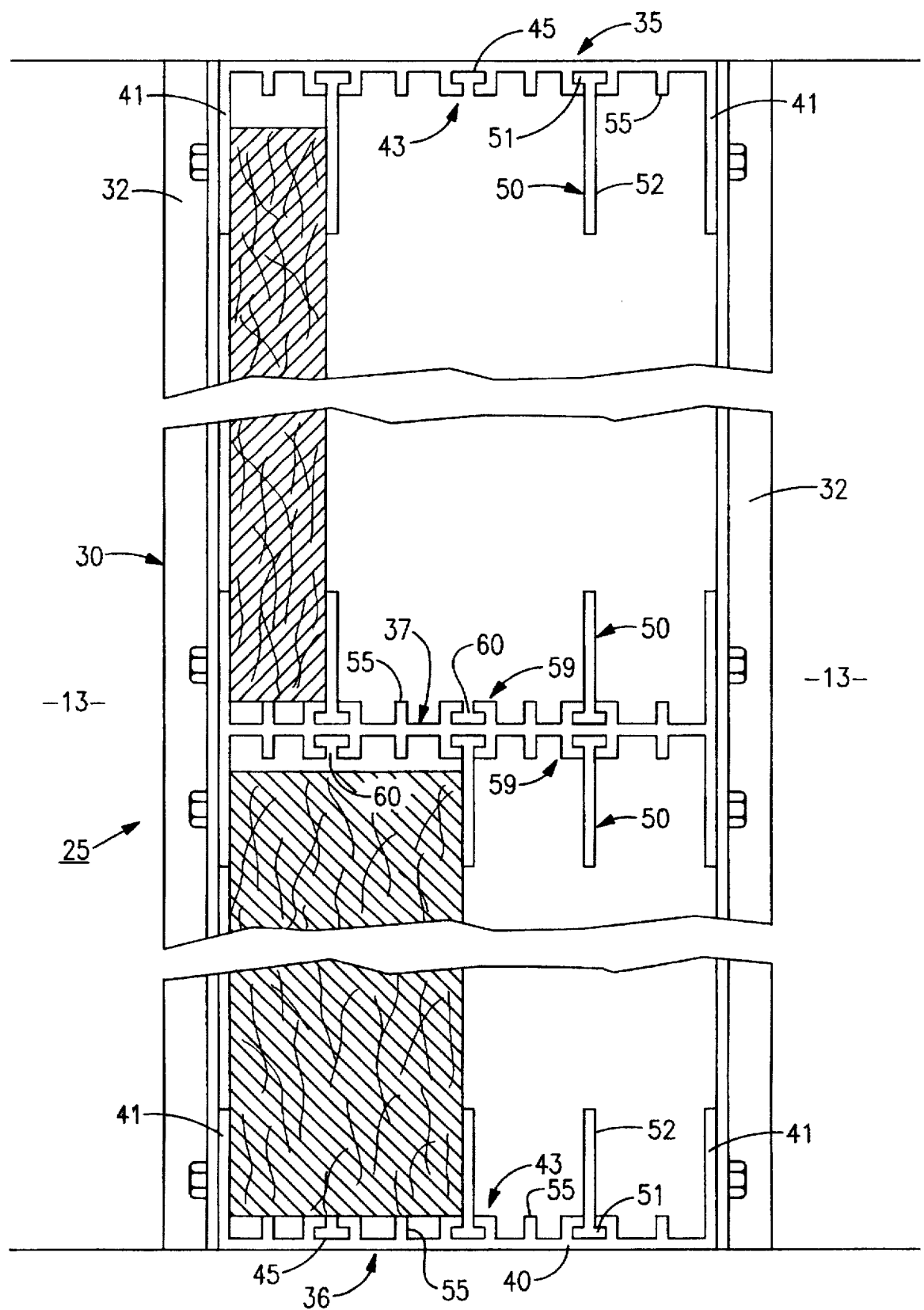

FIG. 1 is a perspective view of an air handling system employing apparatus of the present invention; and FIG. 2 is an enlarged side elevation in section showing the apparatus of the present invention.

DESCRIPTION OF THE INVENTION

Referring now to the drawings, there is illustrated in FIG. 1, a roof top air handling unit generally referenced 10 that incorporates the teachings of the present invention. The present unit can be mounted in any number of configurations to meet different air handling applications, however, it will be herein described as being employed as an air conditioning system for providing comfort air to a building. Return air from the comfort zone is initially brought into housing 12 and then enters an elongated air duct 13. Under the influence of supply air fan 15, the air is drawn through the duct where it is mixed with outside air in plenums 16 and 17. The air is then passed through a series of heat exchangers 18–20 where the air is either heated or cooled depending on the demand placed on the system. As illustrated, the heat exchangers can be stacked in vertical tiers one above the other and in horizontal rows one behind the other or in different combinations thereof depending on the particular air handling application.

A series of flow directors 22—22 are mounted in the duct upon vertical wall 23 immediately upstream from the filter heat exchanger array. Although not shown, the flow directors can be selectively opened or closed to direct the air flow into a desired heat exchanger tier. Positioned immediately downstream of the air directors is a filter compartment generally referenced 25 containing racks upon which different air filter arrangements can be mounted for removing contaminants from the air stream moving through the duct 24. As will be explained in greater detail below, the filters can be selectively arranged in the racks in various combinations to best service a heat exchanger arrangement for a specific application.

Referring now to FIG. 2, the filter compartment 25 is shown in greater detail. The compartment contains a frame 30 made up of vertically disposed structural elements which, in this case are angle irons 32—32. A series of horizontally disposed support members are bolted or otherwise affixed at their corners to the vertical structural elements so that the members extend across the widths of the air duct. The horizontally disposed support members include an upper support member 35, a lower support member 36 and an intermediate support member 37. The upper and lower support members are of similar construction with each including a horizontal web 40 and a pair of opposed side flanges 41—41 that extend longitudinally along the length of the web. The channel shaped upper support member is mounted in contact with the top wall of the duct and is arranged to open downwardly while the lower support member is similarly mounted against the bottom wall of the duct and is arranged to open upwardly as shown in FIG. 2.

A series of parallel spaced apart ribs 43—43 are carried upon the inside walls of each web 35. Each rib extends across the width of the duct and contains a T-shaped slot 45—45 formed therein. The slots are adapted to slidably receive therein dividers 50—50. Each divider includes a horizontally expanded base 51 and a dependent panel 52. The height of the panel is substantially equal to that of the side flanges carried on the upper and lower support members and the base is slidably received within the T-slots formed in the ribs. Accordingly, the dividers can be slidably inserted and removed from the slots through an opening or doorway provided in the sidewall of the air duct (not shown). A series of parallel raised lugs 55—55 are also mounted upon the inside of the webs midway between each rib pair as well as between each side flange and its adjacent rib. The lugs are brought to the same height as the ribs.

The intermediate support member 37 includes a web 57 and a pair of opposed flanges 58—58. The side flanges extend vertically a given distance to either side of the web. As in the case of the upper and lower support members, the web of the intermediate support member includes raised ribs 59—59 on both its top and bottom surfaces, each of which contain a T-shaped slot 60. The ribs are in vertical alignment with those on the upper and lower support members and are also adapted to slidably receive dividers 50 therein in the manner described above. Here again, the vertical extension of the side flanges 58—58 to either side of the web 57 are substantially equal to the vertical length of the divider panel. Raised lugs 55—55 are also carried on the top and bottom surfaces of the web and are also mounted in vertical alignment with the lugs on the upper and lower support members.

The three support members utilized in the construction of the filter racks are all formed of extruded aluminum. In assembly, the members are easily secured to the frame members 32 by screws 63—63 or the like so that the members span across the width of the air duct. The dividers are then simply mounted in the desired T-slots to create racks of different width to receive various filter combinations for servicing a particular application. As illustrated in FIG. 2, a relatively narrow filter is contained in the upper tier of the filter compartment while a wider filter is mounted in the lower tier of the compartment.

As should be evident from the disclosure above any number of different filter combinations can be obtained employing the apparatus of the present invention. In addition, because the structural members making up the filter compartment are all preformed elements that can be easily assembled at the time of fabrication or erection, the need for numerous sheet metal parts as heretofore required in the construction of filter racks, is eliminated and the cost of construction and time to assemble a unit is greatly reduced.

While the present invention has been particularly shown and described with reference to the preferred mode as illustrated in the drawing, it will be understood by one skilled in the art that various changes in detail may be effected therein without departing from the spirit and scope of the invention as defined by the claims.

I claim:

1. Apparatus for mounting various size filters within an air duct that includes:
   a frame mounted within said duct,
   a top support member and a bottom support member mounted in said frame, each support member having a horizontally disposed web that extends across the duct and a series of parallel spaced apart top ribs that extend longitudinally across the top surface of said web,
   said top support member having opposed side flanges that depend downwardly from and extend longitudinally across the bottom surface of said web,
   said bottom support member having side flanges that extend upwardly from the web a given distance and a series of parallel spaced apart bottom ribs that extend longitudinally across the top surface of said web to act as a vertical support surface for a filter element to be placed thereon, said side flanges and said bottom ribs on said bottom support member being vertically aligned with those on said top support member, and
   top and bottom dividers that are slidably received in said respective top and bottom ribs, each divider having a panel that extends vertically a given distance from the web of a supporting member;
   wherein said divider panels and said side flanges define access spaces into which filter elements are placed.

2. The apparatus of claim 1 wherein said ribs contain T-shaped slots extending longitudinally along the web of a support member and each divider has an expanded base that complements the T-shaped slots for supporting the panel that is slidably received in said T shaped slots.

3. The apparatus of claim 1 wherein said web of the top support member is in contact with a top wall of said duct and the web of bottom support member is in contact with a bottom wall of said duct.

4. The apparatus of claim 1 that further includes raised lugs positioned in the top surface of the web of said bottom support member.

5. The apparatus of claim 1 wherein the vertical height of the flanges and the divider panels are substantially equal.

6. The apparatus of claim 1 wherein said support members are extruded from a lightweight metal.

7. Apparatus for mounting various size filters within an air duct that includes:
   a frame mounted within said air duct,
   a top support member, a bottom support member and at least one intermediate support member mounted in said frame,
   said support members each including a horizontally disposed web that extends across the duct and opposed vertically disposed side flanges depending from the web,
   said top support member having side flanges that depend downwardly from the web of said member a given distance and a series of parallel spaced apart top ribs that extend longitudinally across the bottom surface of said web,
   said bottom support member having side flanges that extend upwardly from the web a given distance and a series of parallel spaced apart bottom ribs that extend longitudinally across the top surface of said web to act as a vertical support surface for a filter element to be placed thereon, said web side flanges and said ribs on said bottom support member being vertically aligned with those on said top member,
   said at least one intermediate support member being mounted in said frame between the top and bottom support members, said intermediate support member having side flanges that extend both upwardly and downwardly from the vent of said member a given distance and a series of parallel spaced apart top and bottom ribs that extend longitudinally across the top and bottom surfaces of said web, said top and bottom ribs and said side flanges of said member being in vertical alignment with those of said top support member and said bottom support member,
   top and bottom dividers that are slidably received in said respective top and bottom ribs, each divider having a vertical panel of a given length, the panels and the side flanges of the support members cooperating to establish racks that extend longitudinally across the duct for receiving filter elements therein.

8. The apparatus of claim 7 wherein said ribs are T-shaped slots that extend across each web and each divider having an extended base for supporting a panel that is slidably received in said T-shaped slots.

9. The apparatus of claim 7 wherein the web of the top support member is in contact with a top wall of said duct and the web of the bottom support member is in contact with a bottom wall of the duct.

10. The apparatus of claim 7 that further includes raised lugs positioned on the top surfaces of the webs of the bottom support member and the intermediate support member.

11. The apparatus of claim 7 wherein the vertical height of the side flanges and the divider panels are substantially equal.

12. The apparatus of claim 7 wherein the support members are extruded from a lightweight metal.

* * * * *